(12) United States Patent  (10) Patent No.: US 7,904,941 B2
Jagadeesan et al.  (45) Date of Patent: Mar. 8, 2011

(54) ADAPTIVE SYSTEM FOR CONTENT MONITORING

(75) Inventors: Ramanathan Jagadeesan, San Jose, CA (US); Bich Nguyen, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1172 days.

(21) Appl. No.: 11/284,666

(22) Filed: Nov. 22, 2005

(65) Prior Publication Data

US 2007/0130077 A1 Jun. 7, 2007

(51) Int. Cl.
G06F 17/00 (2006.01)
G06F 7/04 (2006.01)
G06F 17/30 (2006.01)
H04L 29/06 (2006.01)

(52) U.S. Cl. .............................. 726/1; 726/26
(58) Field of Classification Search ................. 726/1, 26; 705/59
See application file for complete search history.

(56) References Cited

U.S. PATENT DOCUMENTS

| | | | | |
|---|---|---|---|---|
| 2002/0183972 | A1* | 12/2002 | Enck et al. | 702/186 |
| 2006/0156380 | A1* | 7/2006 | Gladstone et al. | 726/1 |
| 2009/0037594 | A1* | 2/2009 | Sever et al. | 709/230 |

OTHER PUBLICATIONS

Carrie, Melville J.; "Network Content Monitoring for SEC Regulatory Compliance", Chronicle Solutions, Version 1.0.1 White Paper Aug. 2003.
Cheek, Kevin, et al. "Role-Based Content Monitoring Expands Enterprise's Ability to Monitor Network Security Dashboard Reporting Gives Broader, Deeper View of Security Risk" Reconnex Corporation, Copyright 2000-2005; obtained at http://www.kwqc.com/global/story.asp?s=4115450&ClientType=Printable.

* cited by examiner

*Primary Examiner* — Kambiz Zand
*Assistant Examiner* — Aubrey H Wyszynski
(74) *Attorney, Agent, or Firm* — Fish & Richardson P.C.

(57) ABSTRACT

A content monitoring system applies policies to data transfers, and adapts the policies based on violations. Each policy includes a rule that detects violations and actions performed when the rule is violated. Policies may be adapted by, for example: enabling an inactive policy; modifying a parameter within a rule or an action; generating a new policy by combining a policy macro with the violating content block or with associated meta-data, for example, a user ID or IP address. An optional rolling buffer can be used to hold the most recent transfers, and newly adapted policies can be reapplied to the buffered content. Some content blocks are reassembled from a stream of terminal control protocol (TCP) packets that are transferred across a network barrier point. Other content blocks come from writes to removable media. Some content must be decoded, for example, a word processor file.

28 Claims, 5 Drawing Sheets

ADAPTIVE SYSTEM FOR CONTENT MONITORING

BACKGROUND OF THE INVENTION

The handling of information about patients and their health care is regulated by the health insurance portability and accountability act (HIPAA). HIPAA sets stringent limits on what may and may not be done with health care information. Similarly, the Gramm-Leach Bliley Act (GLBA) regulates privacy among providers of financial services. A variety of other state and federal rules and laws regulate information handling and privacy.

To ensure compliance with such regulations, some organizations and enterprises monitor the content of e-mails and file transfers. One or more points within data networks or computer systems are designated as barrier points, and data transferred across a barrier point is monitored. For regulatory compliance, an important barrier point is content transferred from internal data networks to the public Internet. Other important barrier points are wherever data may be written onto removable media, such as compact disks (CDs) or digital versatile disks (DVDs).

Content monitoring may also be configured to detect leaks of confidential information. Trade secrets of an enterprise, or information confidential to a customer, should be transferred out of the company only under controlled or authorized conditions.

Some enterprises set limits on how employees may use the company's computer and network equipment. For example, web sites with offensive or illegal content should not be accessed using company equipment. Data transferred into an enterprise can be monitored for content that violates acceptable use policies.

Known approaches to content monitoring allow the administrators of computer and network systems to establish specific policies that are automatically monitored by a content monitoring system. Each policy contains a rule that is applied to content transferred across a boundary point. Transferred content is suspicious or violating when it matches the pattern specified by the rule of any particular policy. When violating content is detected, then the content monitoring system performs the actions specified within that policy.

For example, many credit card numbers contain 16 digits, the last of which are computed by a formula. Such credit card numbers can be represented as a pattern or rule. A policy can include this rule and actions, for example: to archive the content of the data transfer along with when it occurred and the source and destination of the transfer; and to notify the system administrator via a page or an e-mail. A content monitoring system can apply this policy to data transfers that cross a boundary point in one or both directions.

A problem arises with such a policy in that proper transfers of credit card information often occur. For example, credit cards are routinely used to purchase airline tickets for employees who travel on company business.

An alternative rule would be violated only when 20 or more, for example, credit card numbers are included in a single data transfer. This alternative rule is more practical, because the system administrators supervising the content monitoring process are unlikely to be effective if the system falsely flags as suspicious a substantial amount of innocent content.

Nevertheless, this alternative is substantially less secure. Fraudulent use of 19 credit card numbers can create major problems. Further, a series of data transfers, each including, say, only three credit card numbers, does not violate the alternative rule. Nevertheless, a series of such transfers are just as damaging as a single large transfer.

The reduced security of the alternative rule is more acceptable if content monitoring is adaptive. For example, a content monitoring system could typically operate using rules that are violated by 20 or more credit card numbers in a single transfer, but adapt to use a more restrictive rule in response to any violation that involves credit card numbers. Thus, there is a need for a content monitoring system that adapts content monitoring policies.

Another approach to compensating for the reduced security of the alternative rule is to archive all outbound content for later forensic analysis. For example, when the example credit card incident above occurs, forensic analysis could examine one or more of: 1) all outbound transfers that contain even a single credit card number; 2) all outbound transfers that originate from the device that is the source of the violating content; or 3) all outbound transfers from the user who sent the violating content.

However, archiving of all outbound content is practical only for relatively small enterprises that transfer out only a very limited amount of data; otherwise, an excessive amount of storage capacity is required.

Thus, there is a further benefit to adapting content monitoring policies. An adaptation triggered by an incident can selectively archive data based on the particulars of the violating content. As a specific example, in response to the example credit card incident above, a new policy can be added that archives any data transfers that match rule (1), rule (2), or rule (3) above.

BRIEF DESCRIPTION OF THE DRAWINGS

Objects, features, and advantages of various embodiments of the invention will become apparent from the descriptions and discussions herein, when read in conjunction with the drawings. Technologies related to the invention, example embodiments of the invention, and example uses of the invention are illustrated in the following figures.

DETAILED DESCRIPTION OF EMBODIMENTS OF THE INVENTION

The descriptions, discussions and figures herein illustrate technologies related to the invention and show examples of the invention and of using the invention. Known methods, procedures, systems, circuits, or elements may be illustrated and described without giving details so as to avoid obscuring the principles of the invention. On the other hand, details of specific embodiments of the invention are described, even though such details may not apply to other embodiments of the invention.

Some descriptions and discussions herein use abstract or general terms including but not limited to hold, extract, adapt, or generate. Those skilled in the art will appreciate that such terms are a convenient nomenclature for components, data, or operations within a computer, digital device, or electromechanical system. Such components, data, and operations are embodied in physical properties of actual objects including but not limited to electronic voltage, magnetic field, and optical reflectivity. Similarly, perceptive or mental terms including but not limited to compare, determine, and calculate may also be used to refer to such components, data, operations, or physical manipulations.

Figure 1:
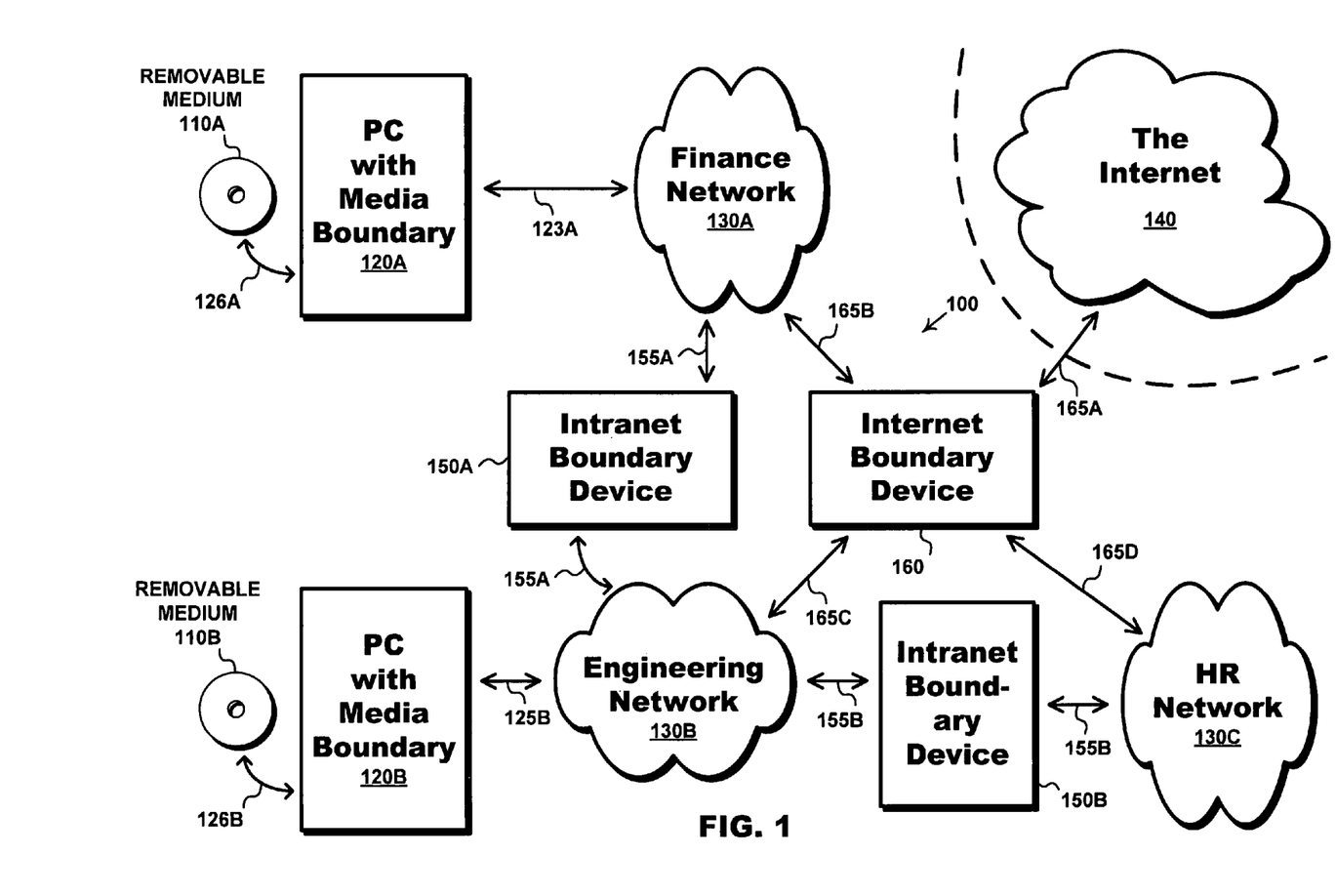
FIG. 1 shows the functional components and their interconnections within a digital network that uses network boundary devices and removable media boundary devices, according to an embodiment of the invention.

FIG. 1 is a network diagram showing network boundary devices and removable media boundary devices boundary devices according to an embodiment of the invention. Example internal network 100 includes three sub-nets, specifically, departmental network 130A for the finance department, 130B for the engineering department, and 130C for the human resources department. Internet network boundary device 160 is on the boundary between internal network 100 and the Internet 140.

Internet network boundary device 160 links the Internet 140 with internal network 100, specifically, with each departmental network 130. The two intranet boundary devices 150 link the three departmental networks with each other. In addition to functioning as a network boundary device, each boundary device 150 or 160 may also function as one or more of: a router, a bridge, a switch, or a firewall.

Internet boundary device 160 transfers data 165 between the Internet 140 and each intranet 130. Device 160 includes one or more of: a set of policies for outgoing traffic; a set of policies for incoming traffic; or a general set of policies for both outgoing and incoming traffic. The outgoing policies are typically, but not necessarily, based on regulatory compliance and confidential information protection. The incoming policies are typically, but not necessarily, based on appropriate use.

Internet boundary device 160 may hold a single set of outgoing policies that is applied to all outgoing data. Alternatively or additionally, device 160 may apply a specialized set of policies to outgoing data transfer 165B from originating the finance department, another specialized set to transfer 165C from engineering, and yet another set to transfer 165D from human resources. For example, if illicit credit card number transfers are more likely in data transfer 165B from finance than in transfer 165C from engineering, then device 160 may be configured to apply an extensive set of rules related to credit cards to transfer 165B and an abbreviated set to transfer 165C.

Intranet boundary device 150A transfers data 155A between the finance network 130A and the rest of the internal network 100. Similarly, intranet boundary device 150B transfers data 155B between the engineering network 130B and rest of the internal network 100.

Each intranet boundary device 150 holds at least one set of policies to be applied to data transfers from one departmental network to another. Each device 150 may hold a single policy set and apply it to all data transferred through the device, or to only data transferred in one direction.

Departmental networks 130A and 130B each include a personal computer (PC) 120. Each PC 120 includes removable media 110. An agent of the content monitoring system runs on PCs 120, and functions as a removable media boundary device.

Figure 2:
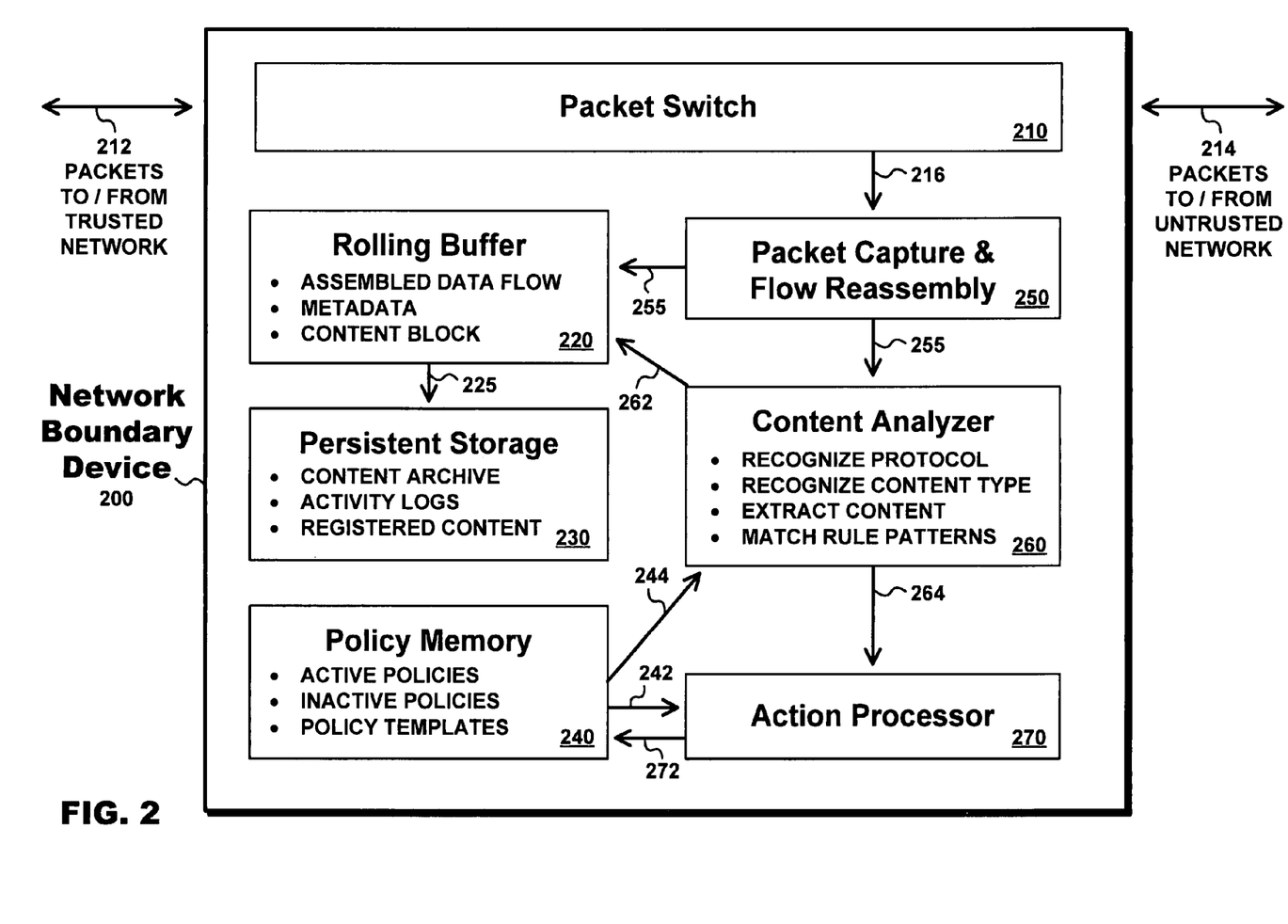
FIG. 2 shows the functional components and their interconnections within a boundary device according to an embodiment of the invention.

FIG. 2 is a functional block diagram of a boundary device, according to an embodiment of the invention. Boundary device 200 could be an Internet boundary device 160, an intranet boundary device 150, or a removable medium boundary device as shown in FIG. 1. Boundary device 200 includes: a packet switch 210; a rolling buffer 220; a persistent storage 230; a policy memory 240; and an action processor 270.

Packet switch 210 switches bidirectional streams 212 and 214 of network packets between, respectively, a trusted network and an un-trusted network. Packet switch 210 also provides captured packets 216 to module 260. In various embodiments of the invention, packet switch 210 interconnects more than two networks, interconnects networks with various degree of security or trust worthiness, or interconnects a device with a removable medium to a computer or network.

In the case of a removable medium boundary device, packet switch 210 may not operate on packets transferred between networks. In such embodiments, switch 210 instead operates on write commands and write data transferred between a main memory and a write buffer or device.

To improve performance, switch 210 can advantageously include hardware specialized to convey network packet traffic. Nevertheless, switch 210 could be any combination of hardware, firmware, and software. To reduce cost and increase flexibility, modules 250, 260, and 270 can advantageously include a firmware controlled processor. Nevertheless, they could be hardware or any combination of hardware, firmware, and software. Various example implementations of boundary device 200 are further described with respect to FIG. 5 below.

Packet switch 210 provides to packet capture and flow reassembly module 250 both captured packets 216 and metadata that describes these packets. This metadata may include, but is not limited to, the time a particular packet arrived at packet switch 210, or an indication of the physical source of that packet.

Various sets of packets are captured in various embodiments of the invention. For example, captured packets 216 may include: all packets transferred in either direction between streams 212 and 214; all packets transferred in only one direction; or only a subset of those packets. The subset of interest and the direction of interest may be selected according to criteria that are predetermined, or criteria that are dynamically programmable or adaptable while the content monitoring system is operating.

Packet switch 210 may include features that operate under the control of content analyzer module 260 or action processor 270 to interrupt a data transfer with violating conflict.

Packet capture and flow assembly module 250 assembles or reassembles packets 216 into assembled flows 255. An assembled flow 255 typically, but not necessarily, contains more data than a single packet and contains data that is at a higher level than packets. For example, module 250 may receive many packets and generate from those packets a single assembled flow 255 that is a reassembled terminal control protocol (TCP) flow. Similarly, packet switch 210 may provide metadata primarily related to the network or data link layers (i.e., layers 3 and 2), of the Open Systems Interconnection (OSI) model, while module 250 provides higher level metadata, for example, a user ID from the application layer (i.e., layer 7).

Packet capture and flow assembly module 250 provides the assembled flows 255 both to rolling buffer 220 and to content analyzer 260. Module 250 may also provide rolling buffer 220 with metadata associated with the assembled flows. This metadata typically, but not necessarily, includes a combination of: metadata received from switch 210; the protocols used to carry or transport the content block detected by module 250; and the user ID of the source of the content block extracted by module 250.

Rolling buffer 220 holds the assembled flows 255 and associated metadata that is generated by packet capture and flow assembly module 250. It also holds content blocks 262 and associated metadata that is generated by content analyzer module 260. Rolling buffer 220 may be used as a temporary storage for this information during the time required for the content monitoring system, specifically for modules 260 and 270, to decide whether or not to archive this information.

Alternatively or additionally, rolling buffer 220 may be large enough to hold several hours, for example, of information. In such embodiments of the invention, when an adaptation 272 is generated by action processor 270, then the adapted policy is scheduled to be reapplied to the content blocks within rolling buffer 220. There are various ways to optimize such reapplication of policies, including but not limited to: not reapplying a changed rule within an adapted policy to a particular content block when that block violated the unchanged rule; and not repeating an action within an adapted policy with respect to a particular content block when that action has already been performed for that block.

Content analyzer module 260 receives the assembled data flows 255. Module 260 may include lower level modules, including but not limited to modules for: protocol recognition; content type recognition; content extraction; content decoding; content decryption; and rule pattern matching. The content types and formats recognized and extracted may include, but are not limited to: e-mail attachments; spreadsheet files (e.g., Microsoft® Excel), document files (e.g., Microsoft® Word or Adobe® Acrobat), or compressed files (e.g., ZIP).

Content analyzer module 260 may or may not be able to decrypt encrypted content. Nevertheless, if module 260 can detect that content has been encrypted, then that factor can be used in a rule. For example, it may be a policy violation to send encrypted data past a barrier point unless the data is being sent to a known domain, for example, to an organization with which the enterprise works closely. Alternatively or additionally, it may be a policy violation to send an unencrypted file to a particular domain.

From the assembled data flow, module 260 generates an extracted content block 262, and provides block 262 to the rolling buffer 220.

Content analyzer module 260 further processes the extracted content block 262 by comparing that block with rules 244. Policy memory 240 provides the rule 244 of each active policy to module 260. If the current block matches the pattern of rule 244, then that content block violates that policy. Various embodiments of the invention support various types of rules and pattern matching, including but not limited to: keywords, regular expressions, matches with target data held in content addressable memories (CAMs), or matches with target data tested my means of a hash table.

Rules may include factors other than matches to the extracted content. Such factors include, but are not limited to, the time of day, or the type of protocol used, for example, hypertext transfer protocol (HTTP), HTTP post, simple mail transfer protocol (SMTP), file transfer protocol (FTP), and the like.

When a block of extracted content satisfies the patterns and other factors within a rule, the rule and its policy are violated. When such an incident occurs, content analyzer module 260 generates violation signal 264.

Violation signal 264 conveys to action processor 270 an indication both of the violating content block and of the policy or policies violated. Policy memory 240 provides to the action processor 270 each action code 242 within each violated policy, and processor 270 performs these actions.

Policy memory 240 holds the set of policies that are currently active within the boundary device 200. As described further with respect to FIG. 3, each policy includes one rule 244 and a set of action codes 242. Policy memory 240 also holds policy macros and currently inactive policies, as described with respect to FIGS. 3 and 4.

Various actions to be performed when content monitoring incidents occur are supported in various embodiments of the invention. The actions available may include: logging a content monitoring event or activity in persistent storage 230; transferring an assembled data flow (and associated metadata) from the rolling buffer 220 to persistent storage 230; transferring an extracted content block (and associated metadata) from the rolling buffer 220 to persistent storage 230; generating e-mails or pages addressed to a system administrator; disabling data transfers through packet switch 210 that meet specified criteria; or sending connection reset commands (for example, a TCP reset) to the source device of the violating content, the destination device of the violating content, or both.

Some actions adapt one or more of the policy sets within network boundary device 200, within other boundary devices in the same network, or both. Action processor 270 generates adaptations 272, which are stored in policy memory 240 as new policies or as modified policies. Such adaptations are further described below with respect to FIGS. 3 and 4 below.

Persistent storage 230 holds the archive of suspicious content, event logs, and optional registered content. Content that is inappropriate for data transfers through a boundary device may be registered. Such content includes, but is not limited to, customer lists, software source code, confidential documents, or employee lists. Registered content may form the basis of, or be referred to in some of the content monitoring rules. Some embodiments of the invention use hash table techniques to attempt to match patterns of registered content within data transfers.

In some embodiments of the invention, packet switch 210 provides the packets being transferred to packet capture and flow reassembly module 250 and then temporarily holds the packets until content analyzer module 260 generates a signal that authorizes the packets for transfer. This approach requires substantial storage within packet switch 210 and quick processing within modules 250 and 260.

In other embodiments, packet switch 210 transfers the packets immediately. In yet other embodiments, packet switch 210 normally transfers the packets immediately, but responds to signals from action processor 270 to disable packets or packet streams that meet characteristics specified by processor 270.

Figure 3:
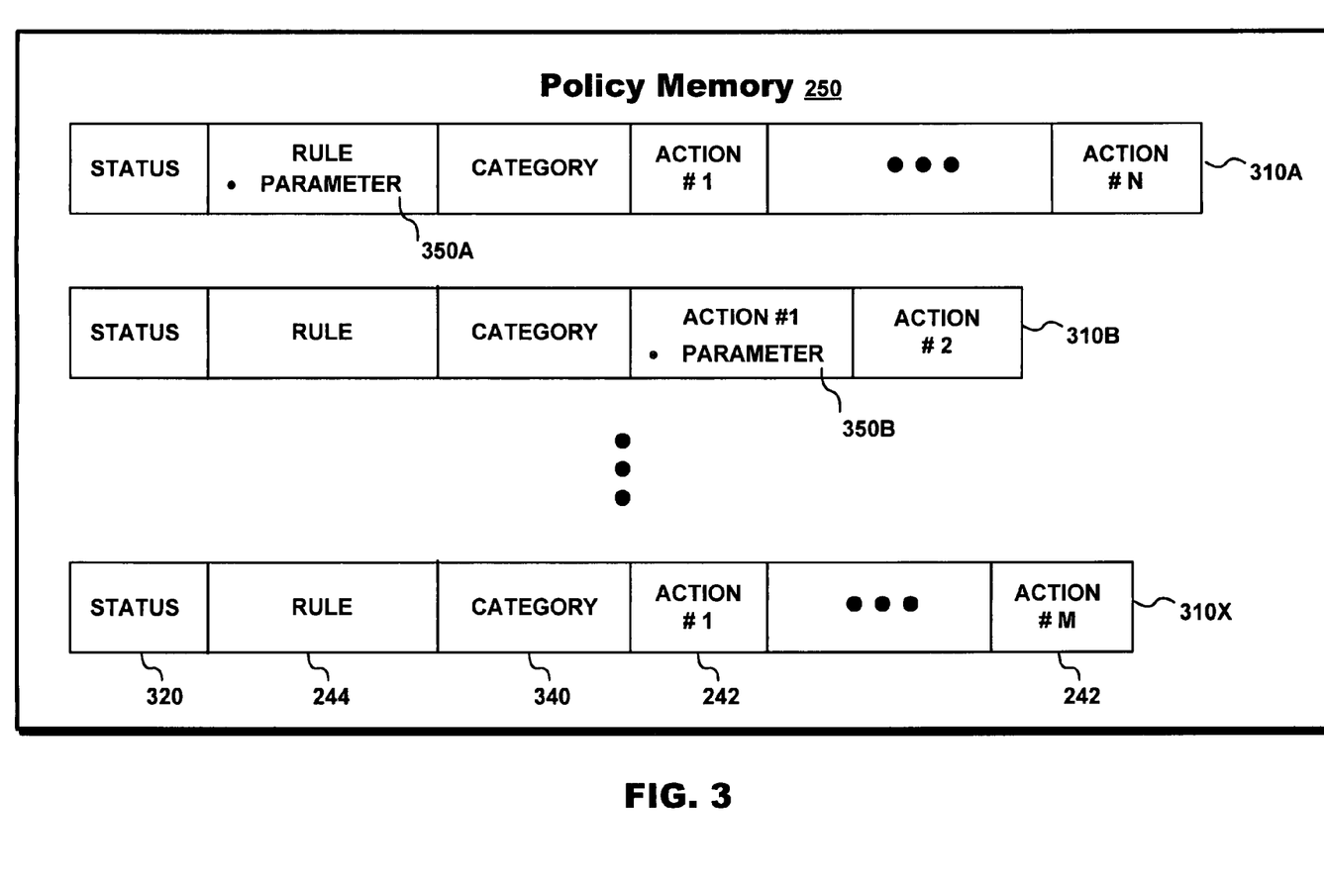
FIG. 3 shows the information contained within each policy, according to an embodiment of the invention.

FIG. 3 is a data structure diagram of policies, according to an embodiment of the invention. Policy memory 250 includes a number of policies 310, each of which includes a rule 244, a set of actions 242, an optional status field 320, and an optional category field 340. Policy memory 250, rules 244, and actions 242 are also shown in FIG. 2.

When a particular policy includes a status field 320, the value of that field indicates whether or not that policy is active. The rule of a policy is not applied to the content extracted from the data transfers when the status field is present and has an inactive value. Thus, an inactive policy cannot be violated. An adaptation, that is, an action that occurs in response to an incident in which a policy is violated, can include adapting the policy set by changing the status field of one or more policies to have an active value.

When a particular policy includes a category field 340, the value of that field may be associated with a default set of actions. If so, then that default action set is performed whenever that policy is violated. If that policy also contains an action set, then those actions may be performed in addition to, or instead of, the default action set. For example, a category value may be "Critical-Violation-Credit-Cards." The default action set may include archiving the violating content, sending a reset message to the source and destination devices, and sending a page to the system administrator on duty.

As another example, a policy category value may be "HIPPA. The default action set for this policy category may include sending an e-mail to the particular system administrator responsible for HIPPA. This person installs and maintains the policies related to HIPPA and handles the incidents that arise from violations of these policies.

The rule of policy 310A includes parameter 350A. An adaptation may include changing the value of this parameter. For example, parameter 350A may be the minimum number of instances of apparent credit card numbers within a single transfer required to trigger a violation. Every policy related to credit card content can include an action that sets the value of this parameter to 2.

As another example, policy 310A may be an inactive policy that archives all data transfers from a particular source device ID, or user ID, the value of which is parameter 350A. A policy could include an action that activates this policy and sets the value of this parameter to the source device ID or user ID that originated the violating content.

The action of policy 310B includes parameter 350B. An adaptation may include changing the value of this parameter. For example, parameter 350B may be the destination address of a stream reset command. The first action of policy 310B could set the value of this parameter to the source device ID that originated the violating content, then the second action sends a stream reset command to that device.

In some embodiments of the invention, a single policy may include multiple rules. In this case such policy is violated when any of the rules are violated, or when all of the rules are violated, or according to another Boolean combination of the results of applying each rule to the extracted content block.

Policy templates may optionally be used. A HIPAA policy template, for example, includes policies with a variety of rules designed to detect confidential health care information. A GLBA policy template is designed to detect confidential financial information. Such templates may be provided as part of the content monitoring system and used as, or system administrators may customize such templates for a particular data network 100. System administrators deploy a policy template by installing its policies on one or more of the boundary checking devices within their computer and network systems.

Figure 4:
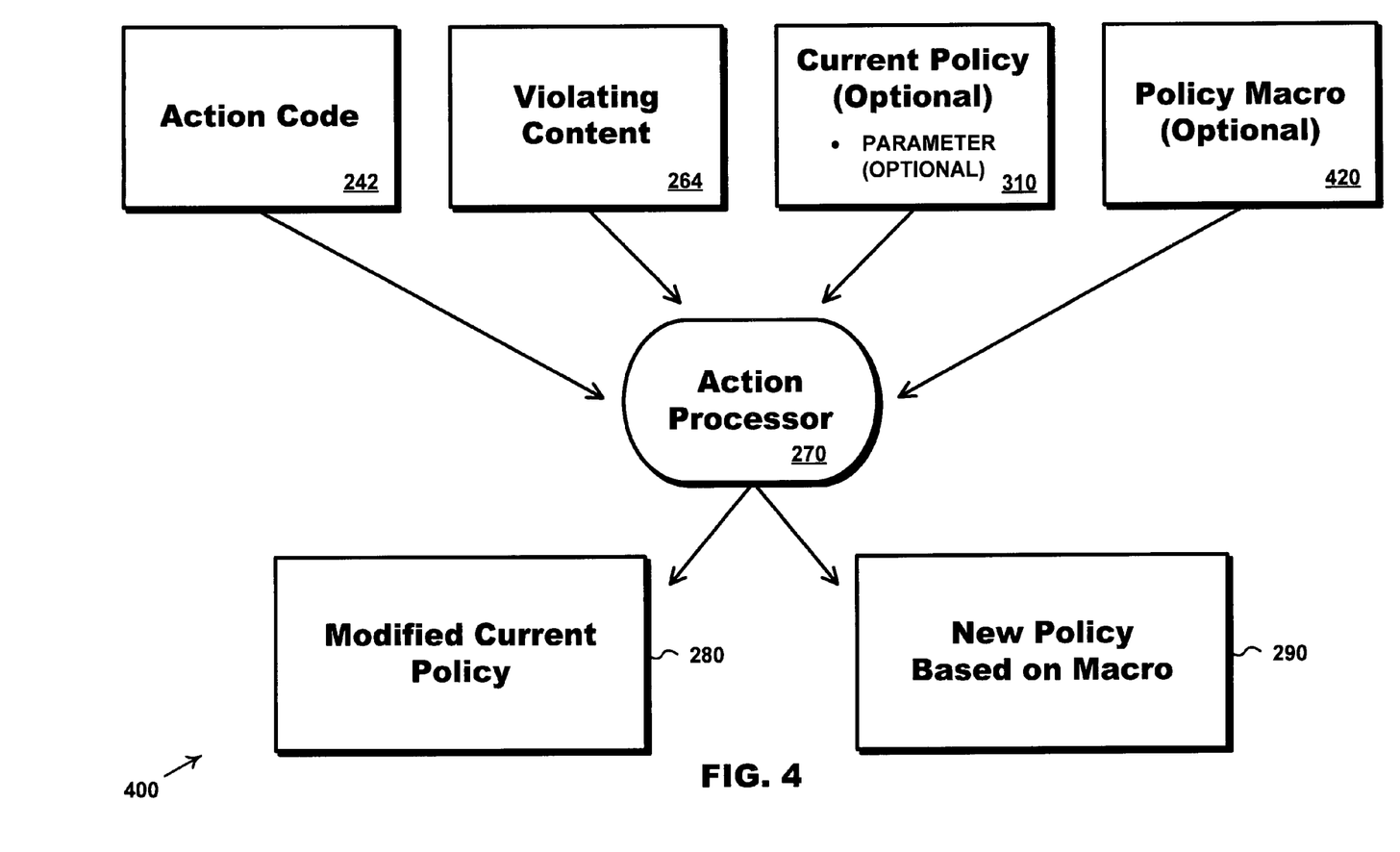
FIG. 4 shows the operations that occur when a policy is adapted, according to an embodiment of the invention.

FIG. 4 is an input/output diagram, according to an embodiment of the invention, of the process of adapting a policy. In process 400, action processor 270 receives action code 242 and violating content 262. Depending on the activities called for in action code 242, action processor 270 may also receive a policy 310 or a policy macro 420. Action code 242 and action processor 270 are also shown in FIG. 2, and policy 310 is also shown in FIG. 3.

Action processor 270 generates adaptations of two types, that is, modifications 280 of current policies, or new policies 290 based on policy macro 420. Modifications of current policies are described with respect to FIG. 3 above.

Policy macro 420, which is optional, includes one or more policies that are to be added to the set of policies used by the boundary device. These policies may be complete in the macro or may include parameters whose values are determined by action processor 270. These parameter values may be determined based on various factors, including but not limited to information contained within the violating content block or metadata about the current content block.

For example, a policy that detects a suspicious transfer of content could use a fan-out technique with regard to any internal recipients of the content. That is, an action within a violated policy can activate multiple policies, each based on a template that archives all data transfers originating from a particular source device ID or user ID. The value of the source ID in each instantiation of the policy macro is set to the destination device ID or user ID to which the violating content is addressed.

As another example, assume that a content monitoring system detects what appears to be 50 credit card numbers in an e-mail or file sent from an internal user "Sammy" to the Internet address "Johns@Smith.org" or "//Smith.org/Johns-files". After this suspicious transfer occurs, 2 credit card numbers per transfer may be a newly appropriate rule that triggers, for example, archiving the content for later analysis. Further, every data transfer sent from anywhere within the enterprise to Smith.org and every data transfer from Sammy to any address outside the enterprise should be archived.

Before the above example incident occurs, there is no reason to single out Sammy, nor Smith.org, nor credit card numbers. Thus, the data transfers that subsequently turn out to be important would probably only be captured by an archiving policy that is too broadly based to be practical. With no characteristic singled out, an impractical amount of transferred data may have to be archived in order to capture those transfers that subsequently become important.

Figure 5:
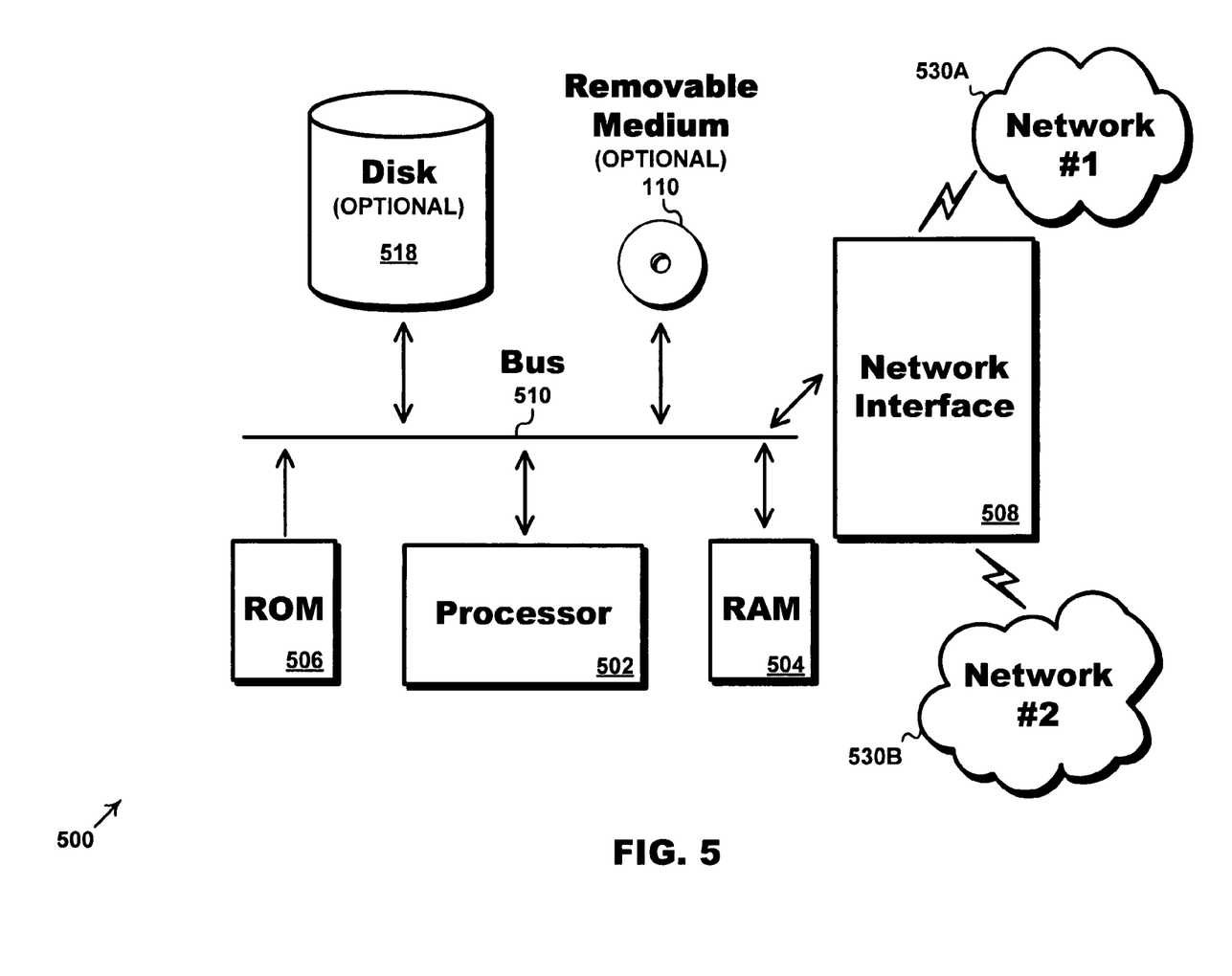
FIG. 5 shows the structural components and their interconnections within a computer system according to an embodiment of the invention.

FIG. 5 is a block diagram, according to an embodiment of the invention, of the structural implementation of a computer system 500. Embodiments of the invention may use system 500, and variants thereon, in various ways. For example, system 500 may be Internet network boundary device 160, intranet boundary device 150, removable media boundary device 120, or the like.

Computer system 500 includes one or more of removable medium 110, RAM 504, ROM 506, network interface and interconnect 508, buses 510, and disk 518. Rolling buffer 220 may be held in disk 518, in RAM 504, or in both. Persistent storage 230 may be held in disk 518, in RAM 504, or in both. Rolling buffer 220 and persistent storage 230 are described with respect to FIG. 2 above.

Computer system 500 includes one or more buses 510 configured to communicate information, such as addresses, operation codes, or data. The computer system also comprises one or more processors 502 configured to process information and data according to instructions and other data. The processor may be, but is not limited to: a central processing unit; a microprocessor; an embedded processor; or a special purpose processor.

Computer system 500 may optionally include RAM 504, that is, one or more volatile memory units, devices or circuits configured to store information, data or instructions. RAM 504 may be but is not limited to random access memory (RAM), static RAM, or dynamic RAM. RAM 504 is coupled to bus 510.

Computer system 500 may optionally include ROM 506, that is, one or more non-volatile memory units or other devices or circuits configured to store static information and instructions. ROM 506 may include, but is not limited to one or more of: read only memory (ROM); programmable ROM; flash memory; electrically programmable ROM (EPROM);

or erasable electrically programmable ROM (EEPROM). ROM 506 is coupled with bus 510.

Computer system 500 may optionally include network interface and interconnect 508, that is, one or more devices or circuits configured to interface with one or more other electronic devices via one or more networks 530. Network interface and interconnect 508 is coupled to bus 510. Network interface and interconnect 508 may optionally perform one or more of: switching, routing, bridging, or relay functions among networks 530. Networks 530 may include, but are not limited to one or more of: Internet protocol (IP) networks; asynchronous transfer mode (ATM) networks; frame relay networks; time division multiplexing (TDM) networks; or the public switched telephone network (PSTN).

Computer system 500 may optionally include disk 518, removable medium 110, or both. These are one or more devices or circuits configured to store information, data or instructions. Devices 518 or 110 may include, but are not limited to one or more of: a mass storage device; a magnetic disk; an optical disk; a compact disk (CD); a writeable CD; a digital versatile disk (DVD); a hard disk; a floppy disk; a flash memory; or a memory stick. Disk 518 and medium 110 are coupled to bus 510.

Although the invention has been described with respect to specific embodiments thereof, these embodiments are merely illustrative, and not restrictive of the invention. For example, network 100, boundary device 200, and computer system 500, as shown in FIGS. 1, 2, and 5 are only illustrative. The invention may be embodied in videoconference systems and devices with more or fewer components, other types of components, or other interconnection schemes.

Further, process 400, as shown in FIG. 4, is only an illustrative example. The invention may be embodied in content monitoring processes with more or fewer activities, other types of activities, and other control flows or concurrencies among the activities. Further, the data and information content described in regard to FIG. 3 are only illustrative examples. The invention may be embodied in methods or systems that use other information content.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings and figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method comprising:
   holding a set of policies, each including at least one rule and at least one action;
   extracting a content block from a data transfer;
   determining, for at least one of the policies, whether or not that policy is violated by the content block by applying the rules of that policy to the content block; and
   performing the actions of that policy when violated, wherein at least one policy of the policy set includes at least one parameter, wherein at least one of the actions performed includes modifying a value of the at least one parameter, and
   wherein steps above are performed by a processor.

2. The method of claim 1,
   wherein the at least one parameter is associated with a credit card transaction.

3. The method of claim 1, wherein the modified value of the parameter is based on data associated with the content block.

4. The method of claim 1, wherein:
   at least one of the policies further has a status;
   applying the rules of a particular policy with a status to the content block only when the status of that particular policy is active; and further comprising
   adapting the policy set including modifying at least one of the policies to have an active status.

5. The method of claim 1, further including:
   holding a policy macro associated with a particular action;
   performing of that particular action including generating a new policy by combining the policy macro with data associated with the content block, and adapting the policy set including adding the new policy to the policy set.

6. The method of claim 1, further comprising:
   buffering multiple content blocks; and
   reapplying, when one of the policies is adapted, the adapted policy to each buffered content block.

7. The method of claim 1, further comprising:
   holding a default set of actions associated with a particular category of the policies; and
   performing the default action set when a policy that is violated belongs to that particular category.

8. The method of claim 1, wherein extracting the content block further includes reassembling a terminal control protocol (TCP) stream from packets that are transferred across a network barrier point.

9. The method of claim 1, wherein the extracting of the content block further includes copying data transfers across a removable media barrier point.

10. The method of claim 1, further comprising decoding the content block prior to applying the rules to the content block.

11. A device comprising:
    a memory configured to hold a set of policies, wherein each policy includes at least one rule and at least one action;
    an extractor configured to extract a content block from a data transfer;
    a pattern matcher configured to apply, for at least one of the policies, the rules of that policy to the content block and to thereby determine whether or not the content block violates that policy; and
    a processor configured to perform the actions of that policy when violated, wherein at least one policy of the policy set includes at least one parameter, and to adapt the policy set in response to at least one of the actions performed by modifying a value of the at least one parameter.

12. The device of claim 11, wherein the modified value of the parameter is based on data associated with the content block.

13. The device of claim 11, wherein:
    at least one of the policies further has a status;
    the pattern matcher is further configured to apply the rules of a particular policy with a status to the content block only when the status of that particular policy is active; and
    the processor is further configured to adapt the policy set by modifying at least one policy to have an active status.

14. The device of claim 11, wherein:
    the memory is further configured to hold a policy macro associated with a particular action;
    the processor is further configured to generate, in response to that particular action, a new policy by combining the policy macro with data associated with the content block; and
    the processor is further configured to adapt the policy set by adding the new policy thereto.

15. The device of claim 11, further comprising a buffer configured to hold multiple content blocks, wherein the pattern matcher is further configured to reapply, when one of the policies is adapted, the adapted policy to each buffered content block.

16. The device of claim 11, further comprising a network barrier point configured to provide the content extractor with network packets from the data transfer, wherein the content extractor is further configured to generate the content block by reassembling a terminal control protocol (TCP) stream from the network packets.

17. The device of claim 11, further comprising a removable media barrier point configured to provide the content extractor with write data from a write operation onto a removable data recording medium, wherein the content extractor is further configured to generate the content block from the write data.

18. The device of claim 11, wherein the content extractor is further configured to decode the content block.

19. A device comprising:
  means for holding a set of policies, each including at least one rule and at least one action;
  means for extracting a content block from a data transfer;
  means for applying the rules of at least one of the policies to the content block and for thereby determining whether or not the content block violates that policy; and
  means for performing the actions of that policy when violated, wherein at least one policy of the policy set includes at least one parameter, and for adapting the policy set in response to at least one of the actions performed by modifying a value of the least one parameter.

20. A non-transitory computer readable medium containing computer executable instructions to perform a method, the method comprising:
  holding a set of policies, each including at least one rule and at least one action;
  extracting a content block from the data transfer;
  determining, for at least one of the policies, whether or not that policy is violated by the content block by applying the rules of that policy to the content block; and
  performing the actions of that policy when violated, wherein at least one policy of the policy set includes a parameter, wherein at least one of the actions performed includes modifying a value of the at least one parameter.

21. The computer readable medium of claim 20, wherein the modified value of the parameter is based on data associated with the content block.

22. The computer readable medium of claim 20, wherein at least one of the policies further has a status, and wherein the process further includes:
  applying the rules of a particular policy with a status to the content block only when the status of that particular policy is active; and further comprising
  adapting the policy set including modifying at least one policy to have an active status.

23. The computer readable medium of claim 20, wherein the process further comprises holding a policy macro associated with a particular action, wherein the performing of that particular action includes generating a new policy by combining the policy macro with data associated with the content block, and wherein adapting the policy set includes adding the new policy to the policy set.

24. The computer readable medium of claim 20, wherein the process further comprises:
  buffering multiple content blocks; and
  reapplying, when one of the policies is adapted, the adapted policy to each buffered content block.

25. The computer readable medium of claim 20, wherein the process further comprises:
  holding a default set of actions associated with a particular category of the policies; and
  performing the default action set when a policy that is violated belongs to that particular category.

26. The computer readable medium of claim 20, wherein the extracting of the content block further includes assembling a terminal control protocol (TCP) stream from packets that are transferred across a network barrier point.

27. The computer readable medium of claim 20, wherein the extracting of the content block further includes monitoring data transfers across a removable media barrier point.

28. The computer readable medium of claim 20, wherein the process further comprises decoding the content block prior to applying the rules to the content block.

* * * * *

UNITED STATES PATENT AND TRADEMARK OFFICE
CERTIFICATE OF CORRECTION

| | | |
|---|---|---|
| PATENT NO. | : 7,904,941 B2 | Page 1 of 1 |
| APPLICATION NO. | : 11/284666 | |
| DATED | : March 8, 2011 | |
| INVENTOR(S) | : Jagadeesan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1205 days.

Signed and Sealed this

Twentieth Day of September, 2011

David J. Kappos
*Director of the United States Patent and Trademark Office*